United States Patent
Cherian et al.

(10) Patent No.: US 12,058,750 B2
(45) Date of Patent: Aug. 6, 2024

(54) TRANSMISSION OPPORTUNITY HANDLING FOR MULTI-LINK COMMUNICATIONS

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US); Sai Yiu Duncan Ho, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 17/197,747

(22) Filed: Mar. 10, 2021

(65) Prior Publication Data

US 2021/0289575 A1 Sep. 16, 2021

Related U.S. Application Data

(60) Provisional application No. 62/988,247, filed on Mar. 11, 2020.

(51) Int. Cl.
*H04W 76/15* (2018.01)
*H04W 74/0808* (2024.01)

(52) U.S. Cl.
CPC ....... *H04W 76/15* (2018.02); *H04W 74/0808* (2013.01)

(58) Field of Classification Search
CPC . H04W 76/15; H04W 74/0808; H04W 84/12; H04L 69/14
See application file for complete search history.

(56) References Cited

U.S. PATENT DOCUMENTS

| | | |
|---|---|---|
| 10,554,370 B2 | 2/2020 | Son et al. |
| 11,252,262 B2 | 2/2022 | Alex et al. |
| 11,317,416 B2 | 4/2022 | Gordaychik |

(Continued)

FOREIGN PATENT DOCUMENTS

EP  3993520  * 7/2019

OTHER PUBLICATIONS

Fang Y., et al., (ZTE TX): "Multi-Link Communication Mode Definition", IEEE Draft; 11-20-0069-01-00BE-Multi-Link-Communication-Mode-Definition, IEEE-SA Mentor, Piscataway, NJ USA vol. 802.11 EHT, 802.11be, No. 1, Feb. 19, 2020 (Feb. 19, 2020), pp. 1-10, XP068165709, Retrieved from the Internet: URL: https:// mentor.IEEE.org/802.11/dcn/20/11-20-0069-01-00be-multi-link-communication-mode-definition.pptx [retrieved on Feb. 19, 2020] p. 8.

(Continued)

*Primary Examiner* — Sudesh M Patidar
(74) *Attorney, Agent, or Firm* — Arun Swain

(57) ABSTRACT

Aspects of the present disclosure generally relate to wireless communications and, more particularly, to techniques for managing multi-link communications. Some aspects of the present disclosure provide techniques for configuring data unit and control response transmissions on multiple links. The data unit and control responses may be configured such that a control response transmission does not overlap with a data unit reception at a station that is without simultaneous transmission and reception capability.

24 Claims, 11 Drawing Sheets

(56) References Cited

U.S. PATENT DOCUMENTS

| | | | | |
|---|---|---|---|---|
| 2009/0196294 | A1* | 8/2009 | Black | H04L 1/1887 370/394 |
| 2012/0008599 | A1* | 1/2012 | Marin | H04W 74/006 370/336 |
| 2016/0088654 | A1* | 3/2016 | Habetha | H04W 40/244 370/338 |
| 2019/0246396 | A1* | 8/2019 | Morioka | H04W 72/0446 |
| 2019/0268099 | A1* | 8/2019 | Chu | H04L 1/1835 |
| 2019/0306837 | A1* | 10/2019 | Choi | H04W 74/0833 |
| 2019/0364555 | A1* | 11/2019 | Huang | H04W 72/048 |
| 2021/0014811 | A1 | 1/2021 | Seok et al. | |
| 2021/0315036 | A1* | 10/2021 | Jang | H04L 1/1887 |
| 2021/0329547 | A1* | 10/2021 | Kim | H04W 52/0229 |
| 2021/0368491 | A1* | 11/2021 | Song | H04W 72/0406 |
| 2021/0385006 | A1* | 12/2021 | Ryu | H04W 76/15 |
| 2022/0123881 | A1* | 4/2022 | Li | H04L 5/0053 |
| 2022/0141785 | A1* | 5/2022 | Gan | H04W 56/0005 370/350 |
| 2022/0239589 | A1* | 7/2022 | Uberoy | H04L 45/38 |
| 2022/0272783 | A1* | 8/2022 | Yang | H04L 5/0048 |
| 2023/0073114 | A1 | 3/2023 | Jang et al. | |

OTHER PUBLICATIONS

International Search Report and Written Opinion—PCT/US2021/021811—ISA/EPO—Jun. 7, 2021.
Song T., et al., (LG Electronics): "Multi-Link Acknowledgement Follow Up" IEEE Draft; 11-20-0012-00-00BE-Multi-Link-Acknowledgement- Follow-Up, IEEE-SA Mentor, Piscataway, NJ USA vol. 802.11 EHT, 802.11be, Jan. 13, 2020 (Jan. 13, 2020), pp. 1-14, XP068165170, Retrieved from the Internet: URL: https://mentor.eee.org/802.11/dcn/20/11-20-0012-00-00be-multi-link-acknowledgement-follow-up.pptx [retrieved on Jan. 13, 2020] Slides 3, 8 and 9.

* cited by examiner

TRANSMISSION OPPORTUNITY HANDLING FOR MULTI-LINK COMMUNICATIONS

CROSS-REFERENCE TO RELATED APPLICATION

This application claims benefit of and priority to U.S. Provisional Application No. 62/988,247, filed Mar. 11, 2020, which is hereby assigned to the assignee hereof and hereby expressly incorporated by reference herein in its entirety as if fully set forth below and for all applicable purposes.

TECHNICAL FIELD

Certain aspects of the present disclosure generally relate to wireless communications and, more particularly, to multi-link communications.

DESCRIPTION OF THE RELATED TECHNOLOGY

Wireless communications networks are widely deployed to provide various communications services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

The systems, methods and devices of this disclosure each have several innovative aspects, no single one of which is solely responsible for the desirable attributes disclosed herein. Certain aspects of the present disclosure generally relate to wireless communications and, more particularly, to techniques for link management for managing multi-link communications.

One innovative aspect of the subject matter described in this disclosure can be implemented in an apparatus for wireless communications. The apparatus generally includes a first interface configured to obtain a first data unit on a first link and obtain a second data unit on a second link and a processing system configured to generate a first control response for the first data unit to be transmitted on the first link and generate a second control response for the second data unit to be transmitted on the second link, where generating the second control response includes configuring one or more parameters of the second control response in accordance with one or more parameters of the first control response, and the first interface or a second interface configured to output the first control response for transmission on the first link and the second control response for transmission on the second link.

Another innovative aspect of the subject matter described in this disclosure can be implemented in an apparatus for wireless communications. The apparatus generally includes a first interface configured to output a first data unit for transmission on a first link and output a second data unit for transmission on a second link, the first interface or a second interface configured to obtain a first control response for the first data unit and obtain a second control response for the second data unit, and a processing system configured to generate a third data unit to be transmitted on the first link after reception of the first control response and generate a fourth data unit to be transmitted on the second link after the reception of the second control response, where the processing system is further configured to defer the transmission of the fourth data unit such that a beginning of the transmission of the fourth data unit coincides with a beginning of the transmission of the third data unit and further where the first interface or the second interface is further configured to output the third data unit for transmission on the first link and output the fourth data unit for transmission on the second link.

Another innovative aspect of the subject matter described in this disclosure can be implemented in a method for wireless communication. The method generally includes obtaining a first data unit on a first link and a second data unit on a second link, generating a first control response for the first data unit to be transmitted on the first link, generating a second control response for the second data unit to be transmitted on the second link, where generating the second control response includes configuring one or more parameters of the second control response in accordance with one or more parameters of the first control response and outputting the first control response for transmission on the first link and the second control response for transmission on the second link.

Another innovative aspect of the subject matter described in this disclosure can be implemented in a method for wireless communication. The method generally includes outputting a first data unit for transmission on a first link and a second data unit for transmission on a second link, obtaining a first control response for the first data unit and a second control response for the second data unit, generating a third data unit to be transmitted on the first link after reception of the first control response, generating a fourth data unit to be transmitted on the second link after the reception of the second control response, deferring the transmission of the fourth data unit such that a beginning of the transmission of the fourth data unit coincides with a beginning of the transmission of the third data unit, and outputting the third data unit for transmission on the first link and output the fourth data unit for transmission on the second link.

Another innovative aspect of the subject matter described in this disclosure can be implemented in an apparatus for wireless communications. The apparatus generally includes means for obtaining a first data unit on a first link and a second data unit on a second link, means for generating a first control response for the first data unit to be transmitted on the first link, means for generating a second control response for the second data unit to be transmitted on the second link, where generating the second control response includes configuring one or more parameters of the second control response in accordance with one or more parameters of the first control response and means for outputting the first control response for transmission on the first link and the second control response for transmission on the second link.

Another innovative aspect of the subject matter described in this disclosure can be implemented in an apparatus for wireless communications. The apparatus generally includes means for outputting a first data unit for transmission on a first link and a second data unit for transmission on a second link, means for obtaining a first control response for the first data unit and a second control response for the second data unit, means for generating a third data unit to be transmitted on the first link after reception of the first control response, means for generating a fourth data unit to be transmitted on the second link after the reception of the second control response, means for deferring the transmission of the fourth data unit such that a beginning of the transmission of the fourth data unit coincides with a beginning of the transmission of the third data unit and means for outputting the third data unit for transmission on the first link and output the fourth data unit for transmission on the second link.

Another innovative aspect of the subject matter described in this disclosure can be implemented in a wireless node. The wireless node generally includes a receiver configured to receive a first data unit on a first link and receive a second data unit on a second link, a processing system configured to generate a first control response for the first data unit to be transmitted on the first link and generate a second control response for the second data unit to be transmitted on the second link, where generating the second control response includes configuring one or more parameters of the second control response in accordance with one or more parameters of the first control response, and a transmitter configured to transmit the first control response on the first link and transmit the second control response on the second link.

Another innovative aspect of the subject matter described in this disclosure can be implemented in a wireless node. The wireless node generally includes a transmitter configured to transmit a first data unit on a first link and a second data unit on a second link, a receiver configured to receive a first control response for the first data unit and receive a second control response for the second data unit and a processing system configured to generate a third data unit to be transmitted on the first link after reception of the first control response and generate a fourth data unit to be transmitted on the second link after the reception of the second control response, where the processing system is further configured to defer the transmission of the fourth data unit such that a beginning of the transmission of the fourth data unit coincides with a beginning of the transmission of the third data unit and further where the transmitter is further configured to transmit the third data unit on the first link and transmit the fourth data unit on the second link.

Another innovative aspect of the subject matter described in this disclosure can be implemented in a computer-readable medium for wireless communications. The computer-readable medium generally includes instructions executable to obtain a first data unit on a first link and a second data unit on a second link, generate a first control response for the first data unit to be transmitted on the first link, generate a second control response for the second data unit to be transmitted on the second link after reception of the second data unit, where generating the second control response includes configuring one or more parameters of the second control response in accordance with one or more parameters of the first control response, and output the first control response for transmission on the first link and the second control response for transmission on the second link.

Another innovative aspect of the subject matter described in this disclosure can be implemented in a computer-readable medium for wireless communications. The computer-readable medium generally includes instructions executable to output a first data unit for transmission on a first link and a second data unit for transmission on a second link, obtain a first control response for the first data unit and a second control response for the second data unit, generate a third data unit to be transmitted on the first link after reception of the first control response, generate a fourth data unit to be transmitted on the second link after the reception of the second control response, defer the transmission of the fourth data unit such that a beginning of the transmission of the fourth data unit coincides with a beginning of the transmission of the third data unit and output the third data unit for transmission on the first link and output the fourth data unit for transmission on the second link.

Another innovative aspect of the subject matter described in this disclosure can be implemented in an apparatus for wireless communications. The apparatus generally includes a first interface configured to output a first data unit on a first link for transmission and a second data unit on a second link for transmission, the first interface or a second interface configured to obtain a first control response for the first data unit on the first link and obtain a second control response for the second data unit on the second link, where the second control response is configured with one or more parameters in accordance with one or more parameters of the first control response and a processing system configured to process the first control response and the second control response.

Another innovative aspect of the subject matter described in this disclosure can be implemented in a method for wireless communication. The method generally includes outputting a first data unit on a first link for transmission and a second data unit on a second link for transmission, obtaining a first control response for the first data unit on the first link, obtaining a second control response for the second data unit on the second link after outputting the second data unit for transmission, where the second control response is configured with one or more parameters in accordance with one or more parameters of the first control response and processing the first control response and the second control response.

Another innovative aspect of the subject matter described in this disclosure can be implemented in an apparatus for wireless communications. The apparatus generally includes means for outputting a first data unit on a first link for transmission and a second data unit on a second link for transmission, means for obtaining a first control response for the first data unit on the first link, means for obtaining a second control response for the second data unit on the second link, where the second control response is configured with one or more parameters in accordance with one or more parameters of the first control response and means for processing the first control response and the second control response.

Another innovative aspect of the subject matter described in this disclosure can be implemented in a wireless node. The wireless node generally includes a transmitter configured to transmit a first data unit on a first link and transmit a second data unit on a second link, a receiver configured to receive a first control response for the first data unit on the first link and receive a second control response for the second data unit on the second link, where the second control response is configured with one or more parameters in accordance with one or more parameters of the first control response, and a processing system configured to process the first control response and the second control response.

Another innovative aspect of the subject matter described in this disclosure can be implemented in a computer-readable medium for wireless communications. The computer-readable medium generally includes instructions executable to output a first data unit on a first link for transmission and a second data unit on a second link for transmission, obtain a first control response for the first data unit on the first link, obtain a second control response for the second data unit on the second link, where the second control response is configured with one or more parameters in accordance with one or more parameters of the first control response and process the first control response and the second control response.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Like reference numbers and designations in the various drawings indicate like elements.

DETAILED DESCRIPTION

Figure 1:
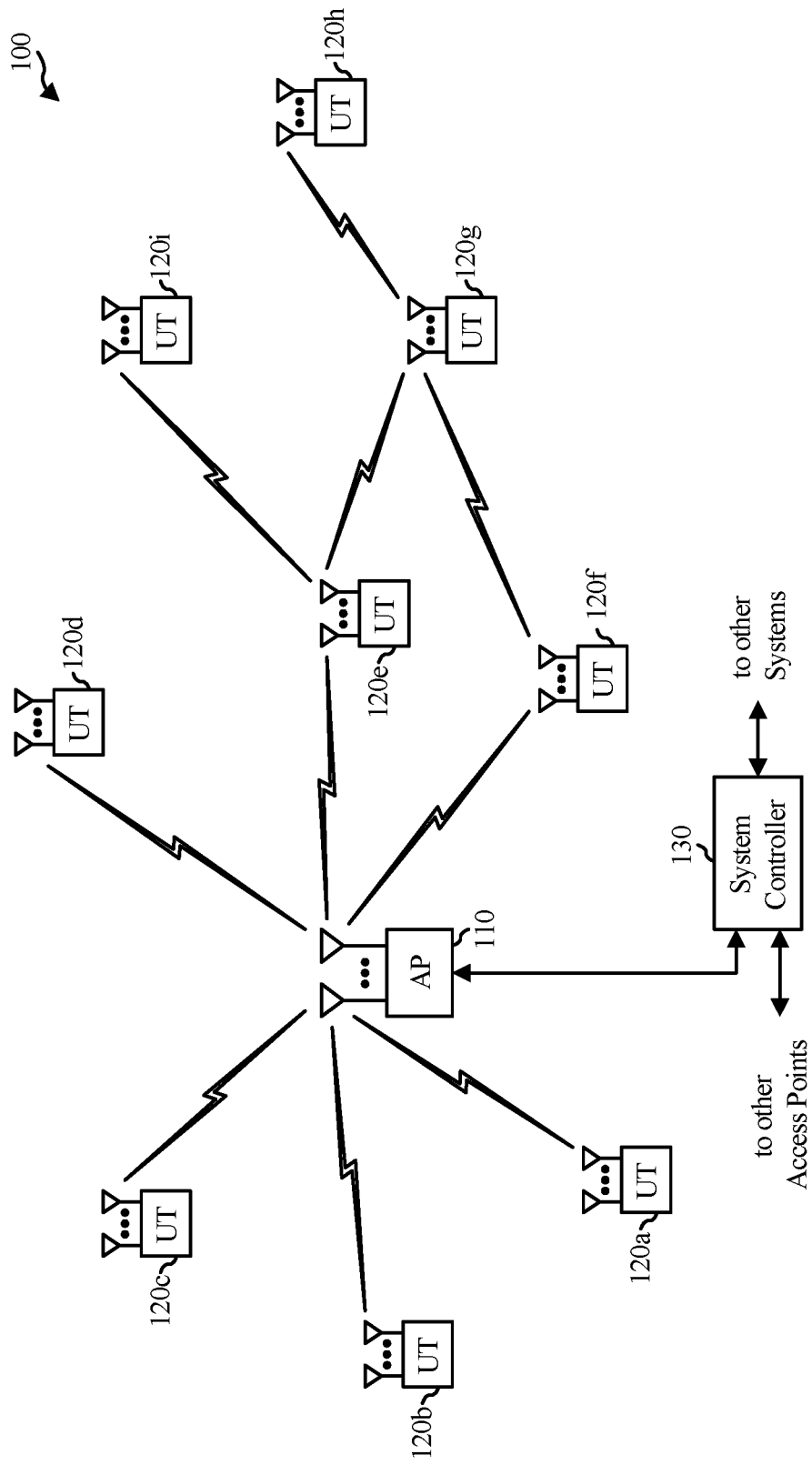
FIG. 1 shows a diagram of an example wireless communications network, in accordance with certain aspects of the present disclosure.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Certain aspects of the present disclosure generally relate to wireless communications and, more particularly, to techniques for link management for multi-link communications with a station (STA) that is not capable of simultaneous reception and transmission (also referred to herein as a non-simultaneous transmit and receive (non-STR) station). For instance, the non-STR station may simultaneously receive first and second data units on multiple links from another station during a transmission opportunity (TXOP), and simultaneously transmit first and second control responses to the data units on the multiple links. As used herein, simultaneous receptions or transmissions generally refers to the receptions or transmissions at least partly overlapping in the time domain. Once the control responses are received, the other station may transmit another data unit on each of the links. In some aspects of the present disclosure, one or more parameters of one of the control responses may be configured in accordance with one or more parameters of another one of the control responses. For example, the control responses' lengths may be configured to match to avoid interfering with reception of a data unit at the non-STR station. The lengths of the control responses may be set based on an indication from the other station. To match the lengths of the control responses, the length of one of the control responses may be adjusted by adding padding to the control response.

In some aspects, the length of the control responses may be different. For example, the length of the second control response may be shorter than the length of the first control response. In this case, the data units transmitted in response to first and second control responses may be transmitted at the same time by the other station by deferring the data unit transmitted in response to the second control response.

Particular implementations of the subject matter described in this disclosure can be implemented to realize one or more of the following potential advantages. For example, aspects of the present disclosure may prevent (or at least reduce the likelihood of) interference that may be caused to a non-STR station. In some aspects, the station transmitting the data unit may be the owner of the TXOP. Configuring the lengths of the control responses to be the same may allow for the TXOP owner to maintain ownership of the TXOP.

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The acronyms listed below may be used herein, consistent with commonly recognized usages in the field of wireless communications. Other acronyms may also be used herein, and if not defined in the list below, are defined where first appearing herein.

ACK . . . Acknowledgement
A-MPDU . . . Aggregated Media Access Control Protocol Data Unit
AP . . . Access Point
BA . . . Block ACK
BAR . . . Block ACK Request
CRC . . . Cyclic Redundancy Check
DIFS . . . Distributed Interframe Space
EHT . . . Extremely High Throughput
EOF . . . End of Frame
EIFS . . . Extended Interframe Space
FCS . . . Frame Check Sequence
HE . . . High Efficiency
HT . . . High Throughput
ID . . . Identifier
IEEE . . . Institute of Electrical and Electronic Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Multiplexing
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QOS . . . Quality of Service
RDG . . . Reverse Direction Grant
S1G . . . Sub-1-GHz
SDMA . . . Spatial-Division Multiple Access
SIFS . . . Short Interframe Space
SIG . . . Signal
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

An Example Wireless Communications System

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communications link from the access point to the user terminals, and the uplink (i.e., reverse link) is the communications link from the user terminals to the access point. A user terminal may also communicate peer-to-peer with another user terminal. A system controller 130 couples to and provides coordination and control for the access points.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions.

For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (such as in order to keep costs down) or multiple antennas (such as where the additional cost can be supported).

Figure 2:
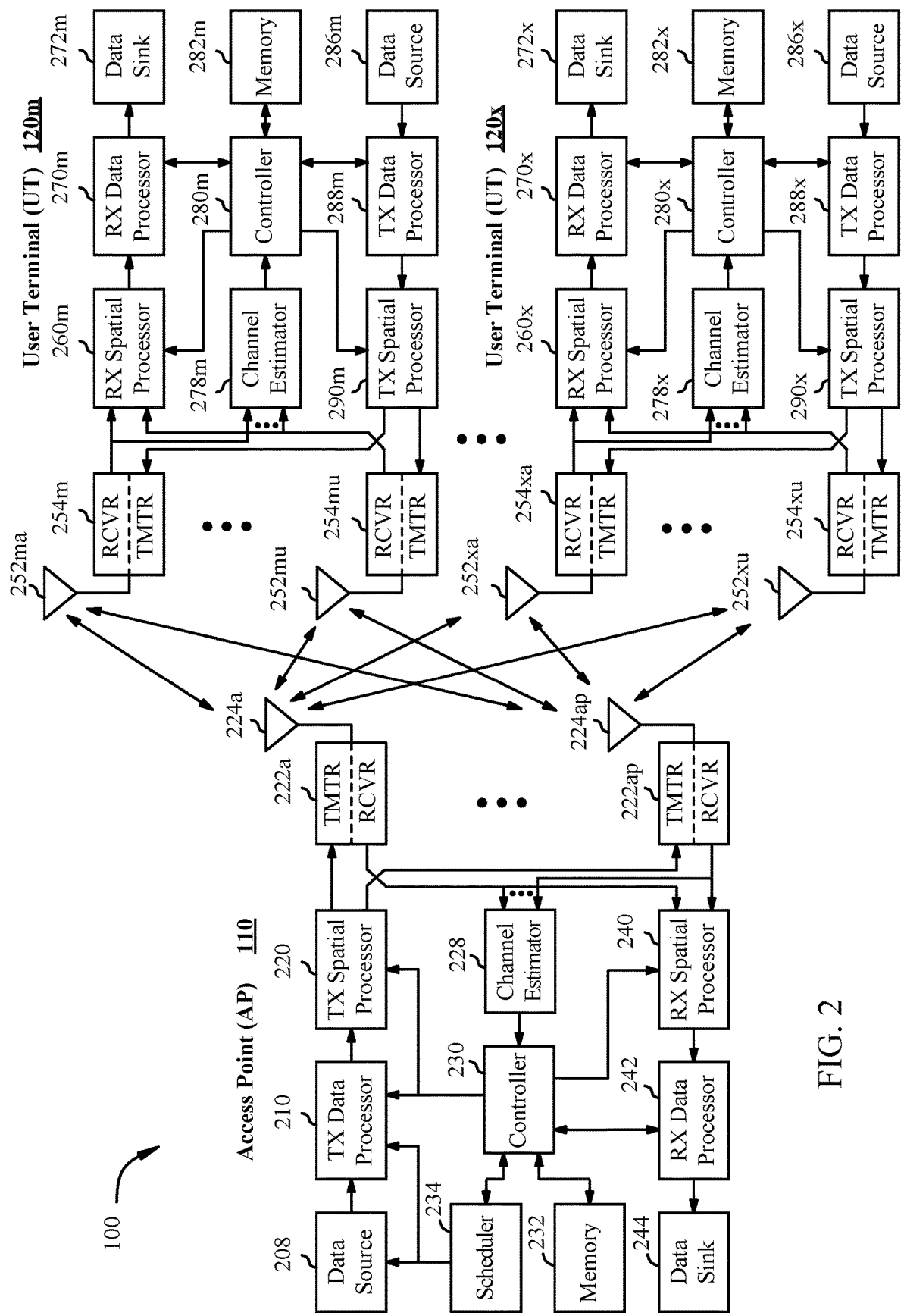
FIG. 2 shows a block diagram of an example access point and example user terminals, in accordance with certain aspects of the present disclosure.

FIG. 2 illustrates a block diagram of access point 110 and two user terminals 120m and 120x in MIMO system 100. The access point 110 and user terminals 120m and 120x may be implemented for communication using OFDMA. OFDMA is a multi-user version of OFDM enabling concurrent AP communication (uplink & downlink) with multiple clients by assigning subsets of subcarriers, called Resource Units (RUs) to the individual clients. 802.11ax uses OFDMA technology for efficient access. OFDMA allows multiple users with varying bandwidth needs to be served simultaneously. OFDMA divides up the spectrum and allocates the spectrum to multiple different users if necessary.

Instead of conventional implementations where users compete with one another to send data in uplink, 802.11ax schedules them so that they don't clash with each other. This managed approach results in better resource utilization and an increase in efficiency. The main benefit of OFDMA is that it allows an AP to allocate the channel to a single user at a time or it may partition a channel to serve multiple users simultaneously. OFDMA is ideal for low bandwidth applications and results in better frequency reuse, reduced latency, and increased efficiency.

In certain aspects, the access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (such as encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (such as demodulates, deinterleaves, and decodes) each recovered uplink data symbol stream in accordance with the rate used for that stream to obtain decoded data. The decoded data for each user terminal may be provided to a data sink 244 for storage or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (such as encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (such as demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. The channel estimation may facilitate communication using multi-link aggregation, as described in more detail herein.

Figure 3:
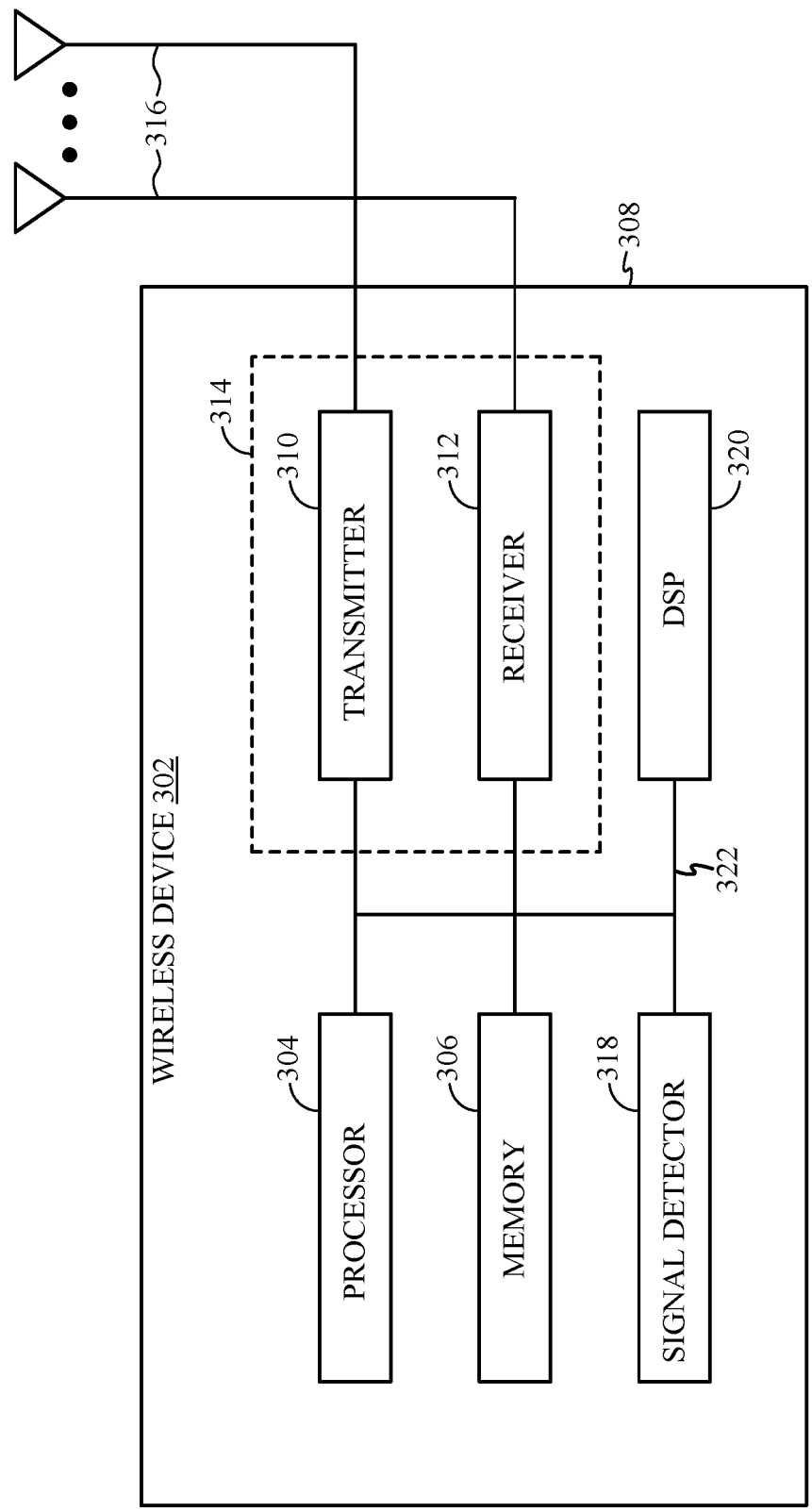
FIG. 3 shows an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure are directed to apparatus and techniques for implementing multi-link communications. For example, certain aspects provide techniques for managing data flows for across multiple links by a multi-link (ML) device (MLD). Multiple bands may be implemented for wireless devices. For example, a wireless device may be able to support at least one of a 2.4 GHz band, a 5 GHz band or a 6 GHz band and operate over more than one link spread over these bands. With multi-link communications, data flows may be transmitted across multiple wireless links which may be associated with different bands.

Certain aspects of the present disclosure implement logical entities to facilitate multi-link communications. For example, a MLD may be implemented in a processing system of a physical device (such as router). An MLD generally refers to a logical entity that includes one or more stations (STAs) (such as virtual STAs). A STA may be an AP STA or a non-AP STA. An AP STA of an AP MLD may be a virtual AP (VAP) operating on a link. An AP of an AP MLD may be part of a multiple basic service set (BSS) identifier (BSSID) set (such as set of BSSIDs configured on a link). As used herein, a STA may refer to a logical entity that is a singly addressable instance of a medium access control (MAC) and physical layer (PHY) interface to the wireless medium (WM). A wireless link generally refers to a path for the WM that may be used to transfer MAC service data units (MSDUs) between two STAs.

Figure 4:
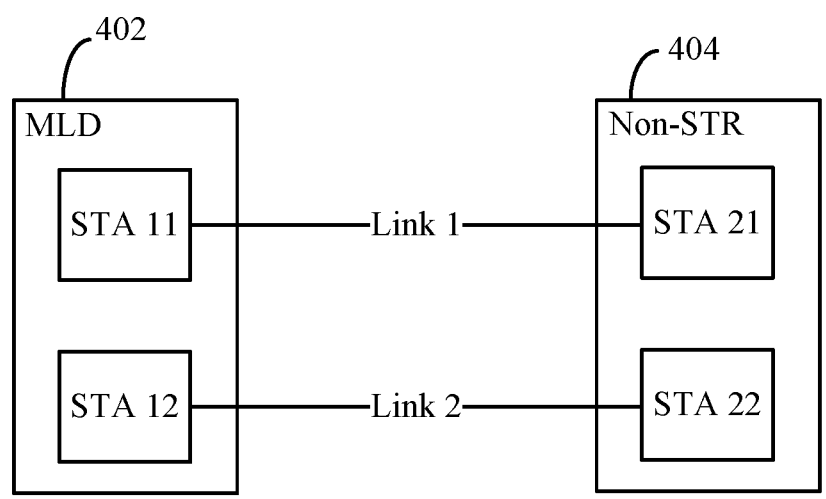
FIG. 4 shows example multi-link devices (MLDs) communicating on wireless links, in accordance with certain aspects of the present disclosure.

FIG. 4 illustrates example MLDs communicating on wireless links, in accordance with certain aspects of the present disclosure. As illustrated, MLD 402 may include multiple virtual STAs (such as AP or non-AP STAs). For example, STA 11 and STA 12 are part of MLD 402, where STA 11 manages link 1 and STA 12 manages link 2. The MLD 402 may be in communication with a non-simultaneous transmit and receive (non-STR) device 404 (also referred to as a non-STR station). In other words, the non-STR device 404 may be incapable of simultaneously transmitting and receiving on links 1 and 2. The non-STR device 404 may include a virtual STA 21 that may manage link 1 and a virtual STA 22 that may manage link 2.

Certain aspects of the present disclosure are directed to techniques for facilitating communication with a non-STR STA. For example, some issues arise due to transmit and receive impairments of a non-STR STA. A communication protocol is introduced in certain aspects that facilitates exchanging of frames with a non-STR STA while maintaining a transmit opportunity (TXOP), as described in more detail herein. The MLD 402 may be a TXOP holder and may have the capability to maintain the same end times of PPDUs that the MLD 402 is transmitting.

In certain aspects, an MLD exchanging frames over multiple links with a non-STR STA may perform specific actions to ensure that exchanges of frames do not inflict interference to the non-STR STA. For example, the MLD may ensure that control frames solicited from the non-STR STA over multiple links end at the same time, as described in more detail herein. For example, the same PPDU length may be used for control responses on the multiple links if a common interframe spacing (such as short interframe space (SIFS)) is used across the links. Moreover, the MLD may ensure that solicitation of control responses on one link does not conflict with reception(s) on another link.

Figure 5:
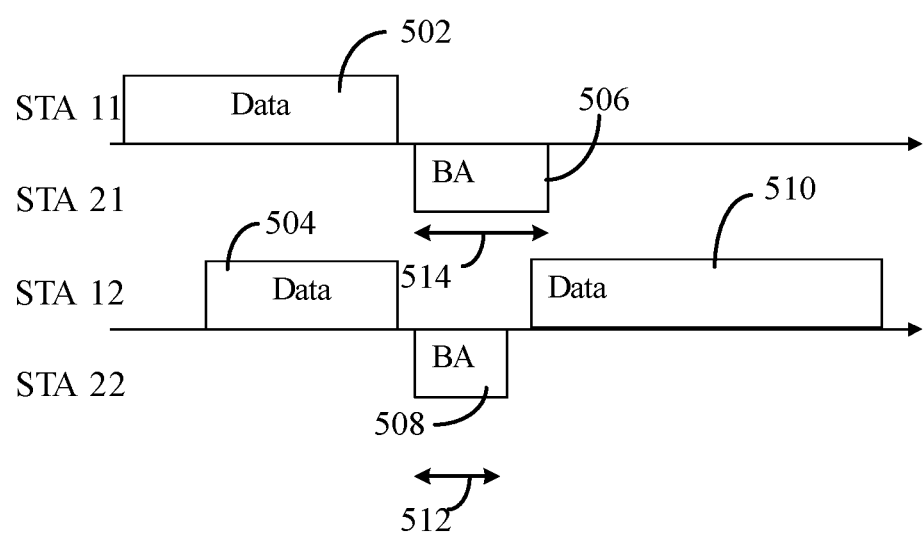
FIG. 5 shows an example scenario where solicitation of a control response on a first link interferes with reception on a second link.

FIG. 5 illustrates an example scenario where solicitation of a control response on link 1 may interfere with a reception on link 2. For example, STA 11 and STA 12 may transmit respective data units 502, 504 on links 1 and 2, as illustrated. The data unit 502 (such as physical protocol data unit (PPDU)) may trigger a first control response 506 (such as block acknowledgement (BA)) from STA 21 on link 1 and the data unit 504 may trigger a second control response 508 from STA 22 on link 2. As illustrated, a length 512 of the second control response 508 may be less than a length 514 of the first control response 506. Moreover, STA 12 may be configured to transmit a data unit 510 after a configured interframe space starting at the end of the reception of control response 508. Thus, STA 21 may be transmitting the first control response 506 when STA 12 begins transmitting data unit 510. Thus, the data unit 510 may interfere with the transmission of the first control response 506 because, as described herein, STA 21 and STA 22 are part of a non-STR STA (such as non-STR device 404) that is not capable of simultaneous transmission and reception on multiple links.

Figure 6:
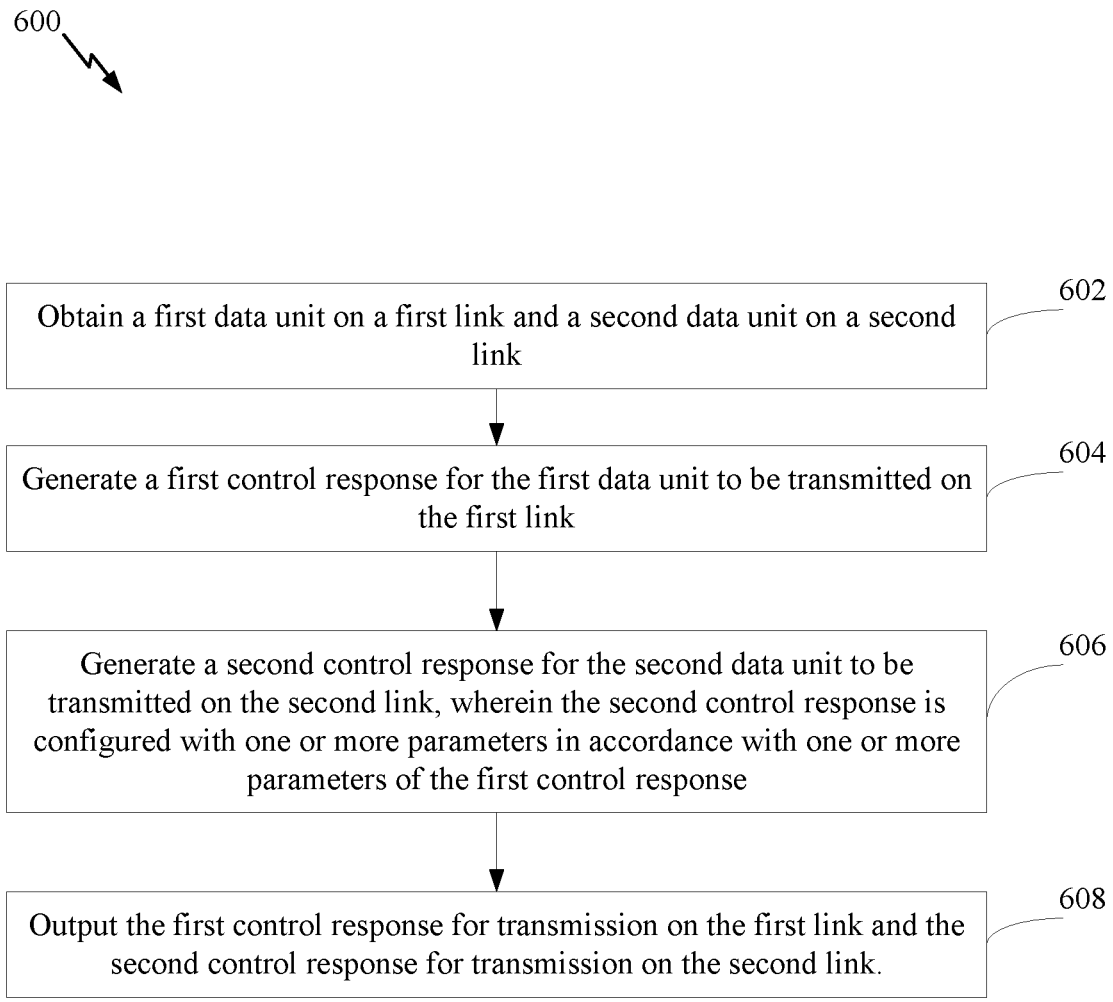
FIG. 6 shows a flow diagram illustrating example operations for wireless communications, in accordance with certain aspects of the present disclosure.

FIG. 6 is a flow diagram illustrating example operations 600 for wireless communications, in accordance with certain aspects of the present disclosure. The operations 600 may be performed, for example, by a wireless node (such as non-STR STA), such as a user terminal (such as UT 120 in the wireless communications network 100) or an access point (such as AP 110 in the wireless communications network 100).

At block 602 of the operations 600, the wireless node obtains a first data unit on a first link and a second data unit on a second link. In certain aspects, the first link may include at least one of a 2.4 GHz link, a 5 GHz link or a 6 GHz link and the second link may include at least one of a 2.4 GHz link, a 5 GHz link or a 6 GHz link.

At block 604, the wireless node generates a first control response for the first data unit to be transmitted on the first link.

At block 606, the wireless node generates a second control response for the second data unit to be transmitted on the second link. In certain aspects, generating the second control response includes configuring one or more parameters such as a length of the second control response in accordance with one or more parameters of the first control response such as a length of the first control response. For example, configuring the length of the second control response in accordance with the length of the first control response may involve matching the lengths of the first control response and the second control response.

Figure 7:
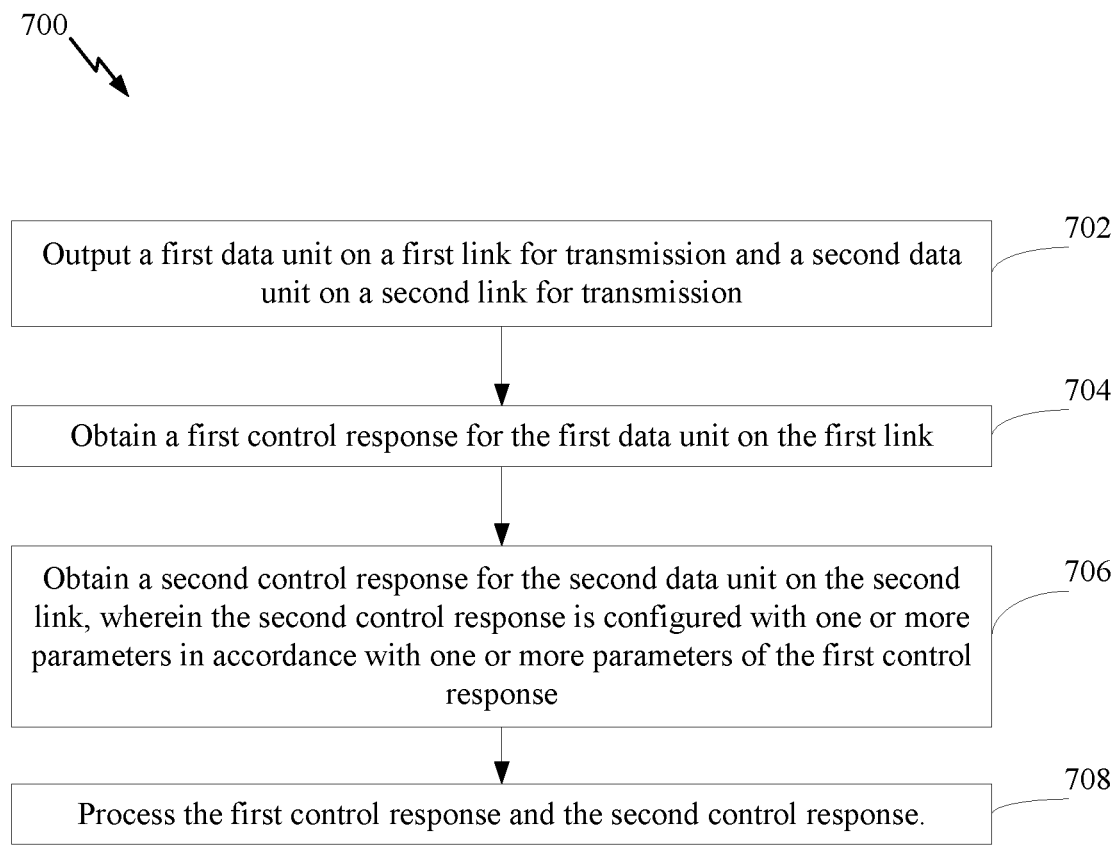
FIG. 7 shows a flow diagram illustrating example operations for wireless communications, in accordance with certain aspects of the present disclosure.

At block 608, the wireless node outputs the first control response for transmission on the first link and the second control response for transmission on the second link FIG. 7 is a flow diagram illustrating example operations 700 for wireless communications, in accordance with certain aspects of the present disclosure. The operations 700 may be performed, for example, by a wireless node (such as TXOP owner), such as a user terminal (such as UT 120 in the wireless communications network 100) or an access point (such as AP 110 in the wireless communications network 100). The operations 700 may be complimentary operations by the TXOP owner to the operations 600 performed by the non-STR STA.

At block 702 of the operations 700, the wireless node outputs a first data unit on a first link for transmission and a second data unit on a second link for transmission. In certain aspects, the first link includes at least one of a 2.4 GHz link, a 5 GHz link or a 6 GHz link and the second link includes at least one of a 2.4 GHz link, a 5 GHz link or a 6 GHz link.

At block 704, the wireless node obtains a first response for the first data unit on the first link At block 706, the wireless node receives a second control response for the second data unit on the second link. In certain aspects, the second control response is configured with one or more parameters such as its length in accordance with one or more parameters such as a length of the first control response.

At block 708, the wireless node processes the first control response and the second control response.

Figure 8:
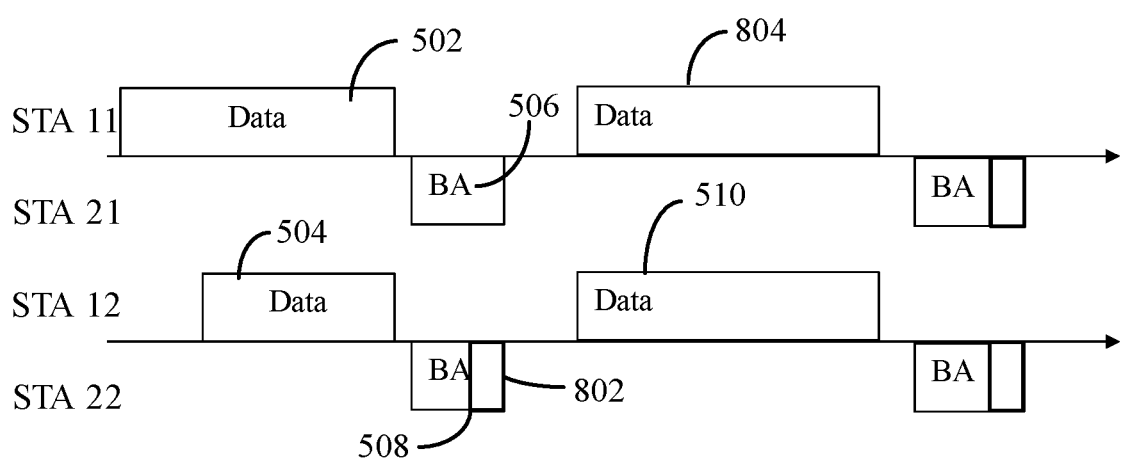
FIG. 8 illustrates example communication of data units and control responses, in accordance with certain aspects of the present disclosure.

FIG. 8 illustrates example communication of data units 502, 504 and control responses 506, 508, in accordance with certain aspects of the present disclosure. The data units 502, 504, 510, and control responses 506, 508 of FIG. 8 may correspond to the data units 502, 504, 510, and control responses 506, 508 of FIG. 5. The data units 502, 504 may be referred to as soliciting data units herein because they solicit (such as trigger) the transmission of control responses 506, 508. As illustrated, the length of the second control response 508 may be configured in accordance with the length of the first control response 506. For example, the length of the second control response 508 may be configured to match the length of the first control response 506 (such as using padding). In this manner, the transmissions of the data units 510, 804 may begin at the same time.

In some aspects, data units may include trigger or trigger response scheduling (TRS) control to solicit control responses on one or more constrained links. For example, the control responses may be trigger-based (TB) physical protocol data units (PPDUs) (such as high-efficiency (HE) PPDUs). In this manner, the non-STR STA may include control responses (such as BAs) in a TB PPDU having a length that is predetermined. For example, the length of the control responses (such as first control response 506 and second control response 508) may be determined based on express indications in the soliciting data units (such as data unit 502 and data unit 504), in some aspects, or the lengths of the control responses may be previously negotiated. In other words, the control response length may be negotiated or explicitly indicated in soliciting MPDUs (such as in data unit 502 or data unit 504).

Expressly indicating the length of a control response may include explicitly indicating the length of the control response or indicating parameters associated with the control response. For example, soliciting data units may indicate a modulation and coding scheme (MCS) and bitmap associated with the control response, which are the parameters that establish the length of the control response.

As described, the length of the control response may be negotiated. For example, the length of the control response (such as explicit length or parameters that establish the length) may be communicated using management frames (such as during establishment of the connection between STAs). In this manner, the non-STR STA may send the control responses (e.g. BAs) in PPDUs with the specified length/parameters as negotiated.

Explicit indication of length in soliciting data units may be performed using various techniques. For example, the length of the PPDU that will carry the control response frame (such as control response 508) may be indicated in the MAC header of the MPDUs contained in the PPDU (such as data unit 504) that is soliciting the response. This may be done by overloading existing control information subfields of an A-Control field. For example, a TRS control field may have a length subfield that may be overloaded to indicate the length (or parameters establishing the length) of the control response. A bit switch in the control information subfield may indicate that new functionality of the field is being used to indicate the length. In certain aspects, a new control information field may be used to indicate the length in the soliciting PPDU.

In certain aspects, a duration/identifier (ID) field of the soliciting data unit(s) (such as MPDUs) may be used for indicating the length. The duration/ID field may also be used for wireless nodes to set their network allocation vector (NAV). NAV is a timer mechanism that maintains a prediction of future traffic on a medium based on duration value information seen in a previous frame transmission. When a wireless node is not transmitting, it is listening for frames from other stations. If the wireless node senses a frame, it reads the header of the frame and determines the duration/ID contained therein. The wireless node sets its NAV timer and defers any transmission on the medium to avoid interference with communications of other stations.

In some cases, the duration/ID field may be used to indicate the length of a control response for MPDUs included in HE or EHT PPDUs as HE or EHT PPDUs may also include TXOP duration in a SIG-A field. For example, instead of the duration/ID field indicating the duration of the entire TXOP, the duration/ID field may indicate the duration of a period including the soliciting data unit transmission and control response transmission, allowing the non-STR STA to determine the length of the control response to be used from the duration/ID field. The peer STA (such as non-STR STA) may understand that the duration/ID field is providing extra functionality (such as indicating length of a control response to be used) based on negotiation or based on differences in values of the duration/ID field and TXOP duration in the SIG-A field. Other STAs may still set the NAV based on the largest of the values in the duration/ID field and TXOP duration in the SIG-A field to avoid interfering with the communications of the TXOP owner.

In certain aspects, one or more parameters such as a length of the second control response 508 may be configured in accordance with the length of the first control response 506 by using padding. For example, padding 802 may be used to match the lengths of the first control response 506 and the second control response 508. When the control response (such as BA) is sent in a high-throughput (HT), very high throughput (VHT), high efficiency (HE), or extremely high throughput (EHT) PPDU, the aggregated-MPDU (A-MPDU) level padding may be used to provide the appropriate solicited length. In some aspects, to extend the control response may be extended by repeating one or more fields in the control response.

In certain aspects, the non-STR STA may use a multi(M)-BA format for the control response where one or more additional BA information fields may be added to the BA so that the requested length is reached. In certain aspects, a new variant of BA format that has padding properties may be used (such as in a similar fashion as the trigger frame). In some cases, an L-Length field of non-HT PPDUs carrying acknowledgement (ACK)/BA frames may be set to a value greater than 14 or 32 octets. In other words, the length indicated by the L-Length field may be increased to match the lengths of the first control response 506 and the second control response 508. While increasing the length of the control response is backwards compliant (such as since legacy STAs that are not the intended recipients of the control response are only required to check receiver address (RA), duration, and frame check sequence (FCS)) it may not be compatible with all implementations.

Figure 9:
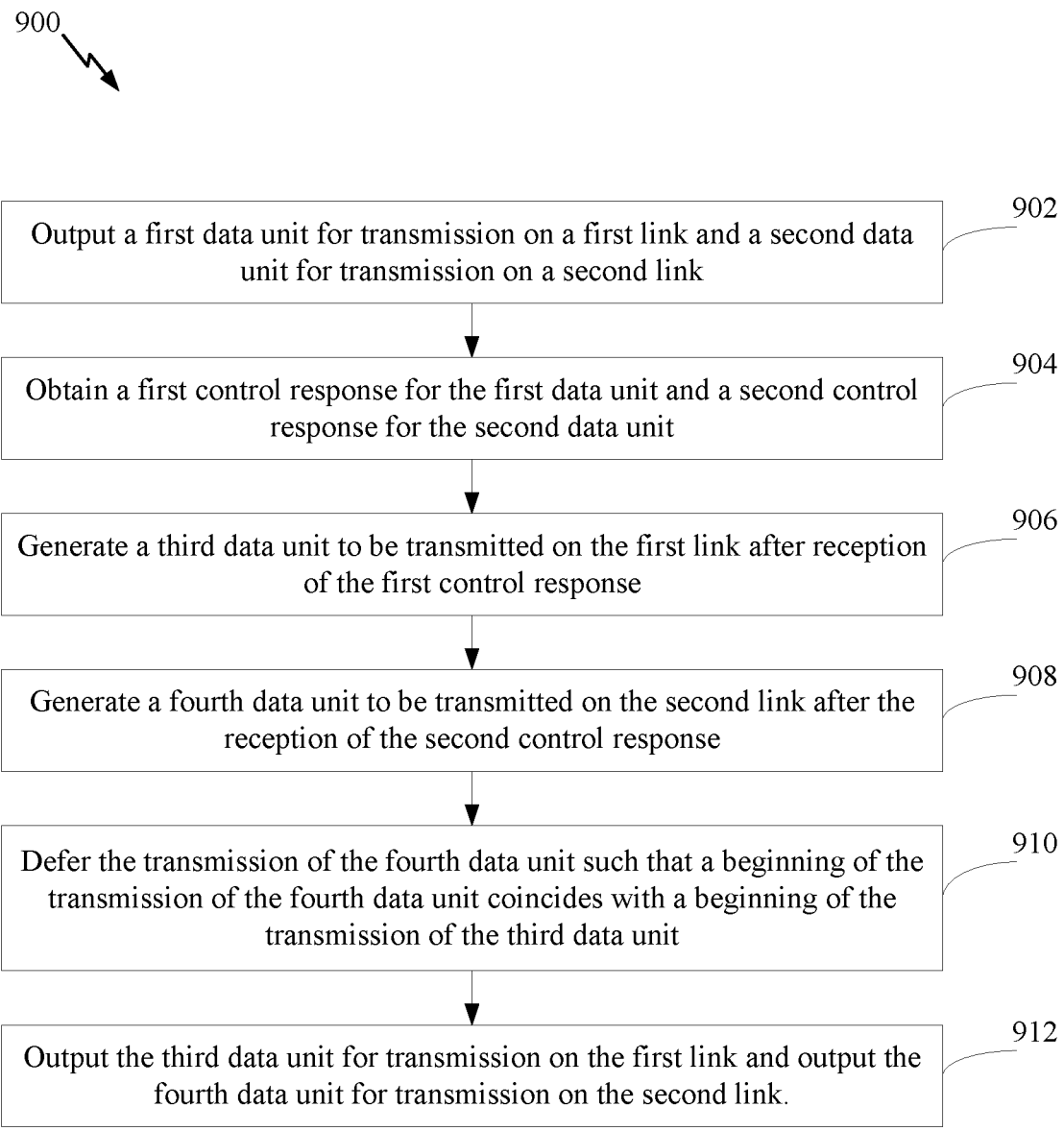
FIG. 9 shows a flow diagram illustrating example operations for wireless communications, in accordance with certain aspects of the present disclosure.

FIG. 9 is a flow diagram illustrating example operations 900 for wireless communications, in accordance with certain aspects of the present disclosure. The operations 900 may be performed, for example, by a wireless node (such as a TXOP owner), such as a user terminal (such as UT 120 in the wireless communications network 100) or an access point (such as AP 110 in the wireless communications network 100).

At block 902 of the operations 900, the wireless node outputs a first data unit for transmission on a first link and a second data unit for transmission on a second link. In certain aspects, the first link includes at least one of a 2.4 GHz link, a 5 GHz link, or a 6 GHz link and the second link includes at least one of a 2.4 GHz link, a 5 GHz link, or a 6 GHz link.

At block 904, the wireless node receives a first control response for the first data unit and a second control response for the second data unit.

At block 906, the wireless node generates a third data unit to be transmitted on the first link after reception of the first control response.

At block 908, the wireless node generates a fourth data unit to be transmitted on the second link after the reception of the second control response.

At block 910, the wireless node may defer the transmission of the fourth data unit such that a beginning of the transmission of the fourth data unit coincides with a beginning of the transmission of the third data unit.

At block 912, the wireless node outputs the third data unit for transmission on the first link and the fourth data unit for transmission on the second link. In other words, the TXOP holder may not initiate transmissions that would otherwise interfere with transmissions initiated by the non-STR STA in other constrained links.

Figure 10:
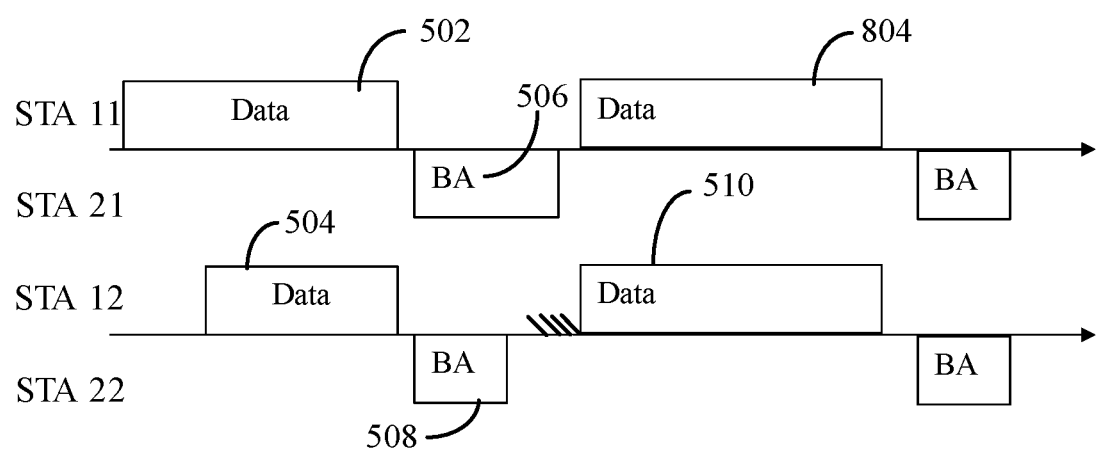
FIG. 10 shows example techniques for deferring a data unit transmission, in accordance with certain aspects of the present disclosure.

FIG. 10 illustrates techniques for deferring a data unit transmission, in accordance with certain aspects of the present disclosure. As illustrated, the length of the first control response 506 may be greater than the length of the second control response 508. As illustrated, in order to prevent the data unit 510 from interfering with the reception of the first control response 506, STA 12 may defer the transmission of the data unit 510. For example, STA 12 may be defer the transmission of the data unit 510 in order for the transmissions of the data units 510, 804 to begin at the same time. By suspending the transmission of the data unit 510, link 2 may remain idle, giving a STA of an overlapping basic service set (OBSS) to take ownership of the TXOP. The data units 502, 504, 510 and control responses 506, 508 of FIG. 10 may correspond to data units 502, 504, 510, and control responses 506, 508 of FIG. 5. Moreover, data unit 804 may correspond to data unit 804 of FIG. 8.

Figure 11:
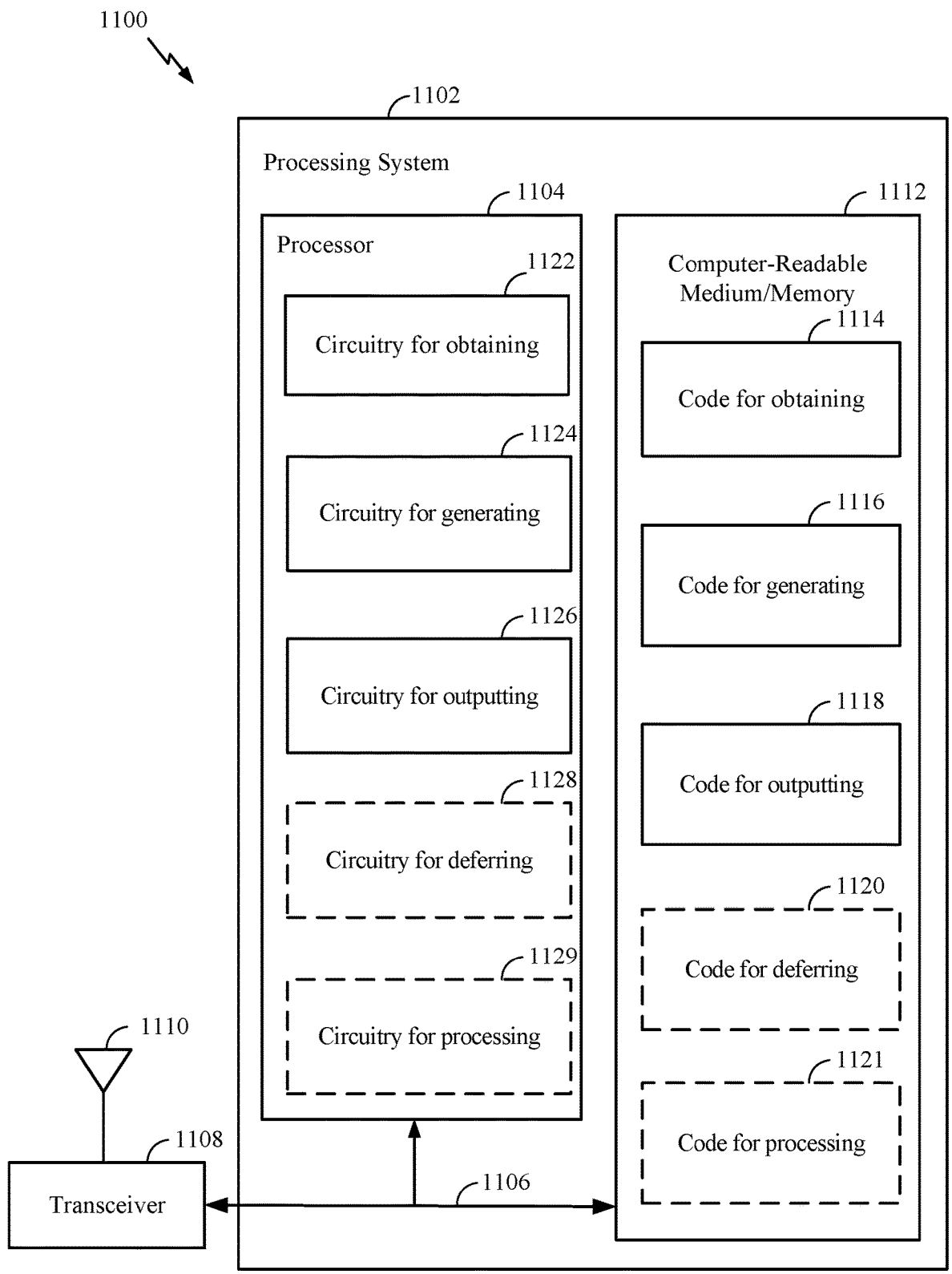
FIG. 11 shows example components capable of performing operations of the present disclosure.

The various operations of methods described above may be performed by any suitable means capable of performing the corresponding functions. The means may include various hardware or software component(s) or module(s), including, but not limited to a circuit, an application specific integrated circuit (ASIC), or processor. Generally, where there are operations illustrated in figures, those operations may have corresponding counterpart means-plus-function components with similar numbering. FIG. 11 illustrates a communications device 1100 that may include various components (such as corresponding to means-plus-function components) configured to perform operations for the techniques disclosed herein, such as the operations illustrated in FIGS. 6, 7 and 9. The communications device 1100 includes a processing system 1102 coupled to a transceiver 1108 (such as a transmitter or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (such as computer-executable code) that when executed by the processor 1104, cause the processor 1104 to perform the operations illustrated in FIGS. 6, 7 and 9, or other operations for performing the various techniques discussed herein for configuring beamforming. In certain aspects, computer-readable medium/memory 1112 stores code 1114 (such as an example of means for) for obtaining; code 1116 (such as an example of means for) for generating (such as adding padding); and code 1118 (such as an example of means for) for outputting; optionally code 1120 (such as an example of means for) deferring; and optionally code 1121 (such as an example of means for) for processing. In certain aspects, the processor 1104 has circuitry configured to implement the code stored in the computer-readable medium/memory 1112.

In certain aspects, the processor 1104 has circuitry configured to implement the code stored in the computer-readable medium/memory 1112. The processor 1104 includes circuitry 1122 (such as an example of means for) for obtaining; circuitry 1124 (such as an example of means for) for generating (such as adding padding); circuitry 1126 (such as an example of means for) for outputting; optionally circuitry 1128 (such as an example of means for) for deferring; and optionally circuitry 1129 (such as an example of means for) for processing.

The transceiver 1108 may provide a means for receiving information such as packets, user data, or control information associated with various information channels (such as control channels, data channels, etc.). Information may be passed on to other components of the device 1100. The transceiver 1108 may be an example of aspects of the transceiver 254 described with reference to FIG. 2. The antenna 1110 may correspond to a single antenna or a set of antennas. The transceiver 1108 may provide means for transmitting signals generated by other components of the device 1100.

For example, means for transmitting (or means for outputting for transmission) may include a transmitter (such as the transmitter unit 222) or an antenna(s) 224 of the access point 110 or the transmitter unit 254 or antenna(s) 252 of the station 120 illustrated in FIG. 2. Means for receiving (or means for obtaining) may include a receiver (such as the receiver unit 222) or an antenna(s) 224 of the access point 110 or the receiver unit 254 or antenna(s) 252 of the station 120 illustrated in FIG. 2. Means for communicating may include a transmitter, a receiver or both. Means for generating, means for deferring, means for obtaining, means for outputting, means for configuring, means for matching, means for determining, means for adding, means for using, means for processing and means for supporting may include a processing system, which may include one or more processors, such as the RX data processor 242, the TX data processor 210, the TX spatial processor 220, or the controller 230 of the access point 110 or the RX data processor 270, the TX data processor 288, the TX spatial processor 290, or the controller 280 of the station 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

EXAMPLE ASPECTS

Aspect 1. A method for wireless communications, including: obtaining a first data unit on a first link and a second data unit on a second link; generating a first control response for the first data unit to be transmitted on the first link after reception of the first data unit; generating a second control response for the second data unit to be transmitted on the second link after reception of the second data unit, where generating the second control response includes configuring one or more parameters of the second control response in accordance with one or more parameters of the first control response; and outputting the first control response for transmission on the first link and the second control response for transmission on the second link.

Aspect 2. The method of aspect 1, where the first link includes at least one of a 2.4 GHz link, a 5 GHz link or a 6 GHz link and the second link includes at least one of a 2.4 GHz link, a 5 GHz link or a 6 GHz link.

Aspect 3. The method of any one of aspects 1-2, where configuring the one or more parameters of the second control response in accordance with the one or more parameters of the first control response includes matching a length of the first control response and a length of the second control response.

Aspect 4. The method of any one of aspects 1-3, where the second data unit includes an indication for triggering the transmission of the second control response, and where the second control response includes a trigger-based data unit being output for transmission in response to the indication.

Aspect 5. The method of any one of aspects 1-4, further including obtaining a management frame having an indication of the one or more parameters of the first control response and the one or more parameters of the second control response.

Aspect 6. The method of any one of aspects 1-5, further including determine the one or more parameters of the first control response and the one or more parameters of the second control response based on an indication in at least one of the first data unit or the second data unit.

Aspect 7. The method of aspect 6, where the indication is part of a control information field of the at least one of the first data unit or the second data unit.

Aspect 8. The method of aspect 7, where the control information field includes a triggered response scheduling (TRS) control field.

Aspect 9. The method of any one of aspects 1-8, further including determining the one or more parameters of at least one of the first control response or the second control response based on a duration field of each of at least one of the first data unit or the second data unit.

Aspect 10. The method of aspect 9, where the duration field indicates a duration from an end of the first data unit or the second data unit to an end of the first control response or the second control response, respectively.

Aspect 11. The method of any one of aspects 1-10, where the one or more parameters of the first control response include a length of the first control response, and where the one or more parameters of the second control response include a length of the second control response.

Aspect 12. The method of any one of aspects 1-11, where generating the second control response includes adding padding to the second control response to configure the one or more parameters of the second control response in accordance with the one or more parameters of the first control response.

Aspect 13. The method of any one of aspects 1-12, where generating the second control response includes using a multi-block acknowledgement (BA) format in order to configure the one or more parameters of the second control response in accordance with the one or more parameters of the first control response.

Aspect 14. The method of any one of aspects 1-13, where generating the second control response includes configuring a number of octets associated with a length field in the second control response in order to configure the one or more parameters of the second control response in accordance with the one or more parameters of the first control response.

Aspect 15. The method of any one of aspects 1-14, further including supporting transmission and reception associated with only non-overlapping time periods.

Aspect 16. A method for wireless communications, including: outputting a first data unit for transmission on a first link and a second data unit for transmission on a second link; obtaining a first control response for the first data unit and a second control response for the second data unit; generating a third data unit to be transmitted on the first link after reception of the first control response; generating a fourth data unit to be transmitted on the second link after the reception of the second control response; deferring the transmission of the fourth data unit such that a beginning of the transmission of the fourth data unit coincides with a beginning of the transmission of the third data unit; and outputting the third data unit for transmission on the first link and output the fourth data unit for transmission on the second link.

Aspect 17. The method of aspect 16, where the first link includes at least one of a 2.4 GHz link, a 5 GHz link or a 6 GHz link and the second link includes at least one of a 2.4 GHz link, a 5 GHz link or a 6 GHz link.

Aspect 18. The method of aspect 16, where the second control response has a longer duration than the first control response.

Aspect 19. The method of aspect 16, where deferring the transmission of the fourth data unit includes deferring the transmission of the fourth data unit at least until an end of the reception of the first control response.

Aspect 20. The method of aspect 16, where each of the first control response and the second control response includes a block acknowledgement (BA).

Aspect 21. A method for wireless communications, including outputting a first data unit on a first link for transmission and a second data unit on a second link for transmission; obtaining a first control response for the first data unit on the first link; obtaining a second control response for the second data unit on the second link, where the second control response is configured with one or more parameters in accordance with one or more parameters of the first control response; and processing the first control response and the second control response.

Aspect 22. The method of Aspect 21, where the first link includes at least one of a 2.4 GHz link, a 5 GHz link or a 6 GHz link, and where the second link includes at least one of a 2.4 GHz link, a 5 GHz link or a 6 GHz link.

Aspect 23. The method of Aspect 21 or 22, where the one or more parameters of the second control response being configured in accordance with the one or more parameters of the first control response includes a length of the first control response matching a length of the second control response.

Aspect 24. The method of any one of Aspects 21-23, where the second data unit includes an indication for triggering the transmission of the second control response and the second control response includes a trigger-based data unit being obtained in response to the indication.

Aspect 25: The method of any one of Aspects 21-24, further including outputting for transmission a management frame having an indication of the one or more parameters of the first control response and the one or more parameters the second control response.

Aspect 26. The method of any one of Aspects 21-25, where at least one of the first data unit or the second data unit includes an indication of the one or more parameters of the first control response and the one or more parameters of the second control response.

Aspect 27. The method of Aspect 26, where the indication is part of a control information field of the at least one of the first data unit or the second data unit.

Aspect 28. The method of Aspect 27, where the control information field includes a triggered response scheduling (TRS) control field.

Aspect 29. The method of any one of Aspects 21-28, where a duration field of each of at least one of the first data unit or the second data unit indicates at least one of the one or more parameters of the first control response or the one or more parameters of the second control response.

Aspect 30. The method of Aspect 29, where the duration field indicates a duration from an end of the first data unit or the second data unit to an end of the first control response or the second control response, respectively.

Aspect 31. The method of any one of Aspects 21-30, where the one or more parameters of the first control response include a length of the first control response and the one or more parameters of the second control response include a length of the second control response.

Aspect 32. The method of any one of Aspects 21-32, where the second control response includes padding added for the one or more parameters of the second control response to be in accordance with the one or more parameters of the first control response.

Aspect 33. The method of any one of Aspects 21-33, where the second control response includes a multi-block acknowledgement (BA) format in order for the one or more parameters of the second control response to be configured in accordance with the one or more parameters of the first control response.

Aspect 34. The method of any one of Aspects 21-33, where a number of octets associated with a length field in the second control response is configured for the one or more parameters of the second control response to be in accordance with the one or more parameters of the first control response.

Aspect 35. An apparatus including means for performing the method of any of aspects 1 through 34.

Aspect 36. An apparatus including at least one processor and a memory coupled to the at least one processor, the memory and the at least one processor being configured to perform the method of any of aspects 1 through 34.

Aspect 37. A computer readable medium storing computer executable code thereon for wireless communications that, when executed by at least one processor, cause an apparatus to perform the method of any of aspects 1 through 34.

As used herein, the term "determining" encompasses a wide variety of actions. For example, "determining" may include calculating, computing, processing, deriving, investigating, looking up (such as looking up in a table, a database or another data structure), ascertaining and the like. Also, "determining" may include receiving (such as receiving information), accessing (such as accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

The invention claimed is:

1. An apparatus for wireless communications, comprising:
   a first station interface configured to obtain a first data unit on a first non-simultaneous transmit and receive (non-STR) link and obtain a second data unit on a second non-STR link;
   a processing system configured to:
      generate a first control response for the first data unit with one or more parameters to be transmitted on the first non-STR link, the one or more parameters of the first control response based on a duration field in at least one of the first data unit or the second data unit;
      generate a second control response for the second data unit with one or more parameters to be transmitted on the second non-STR link, the one or more parameters of the second control response based on the duration field in the at least one of the first data unit or the second data unit; and
      configure the one or more parameters of the second control response in accordance with the one or more parameters of the first control response to align the first control response and the second control response by matching a length of the first control response and a length of the second control response; and
   the first station interface or a second station interface configured to output the first control response for transmission on the first non-STR link and the second control response for transmission on the second non-STR link.

2. The apparatus of claim 1, wherein the second data unit comprises an indication for triggering the transmission of the second control response and wherein the second control response comprises a trigger-based data unit being output for transmission in response to the indication.

3. The apparatus of claim 1, wherein the first station interface or the second station interface is configured to obtain a management frame having an indication of the one or more parameters of the first control response and the one or more parameters of the second control response.

4. The apparatus of claim 1, wherein the processing system is further configured to determine the one or more parameters of the first control response and the one or more parameters of the second control response based on the duration field in the at least one of the first data unit or the second data unit.

5. The apparatus of claim 4, wherein the duration field is part of a control information field of the at least one of the first data unit or the second data unit.

6. The apparatus of claim 4, wherein the duration field indicates a duration from an end of the first data unit or the second data unit to an end of the first control response or the second control response, respectively.

7. The apparatus of claim 1, wherein the one or more parameters of the first control response comprise the length of the first control response, and wherein the one or more parameters of the second control response comprise the length of the second control response.

8. The apparatus of claim 1, wherein generating the second control response comprises adding padding to the second control response to configure the one or more parameters of the second control response in accordance with the one or more parameters of the first control response.

9. The apparatus of claim 1, wherein generating the second control response comprises using a multi-block acknowledgement (BA) format in order to configure the one or more parameters of the second control response in accordance with the one or more parameters of the first control response.

10. The apparatus of claim 1, wherein generating the second control response comprises configuring a number of octets associated with a length field in the second control response in order to configure the one or more parameters of the second control response in accordance with the one or more parameters of the first control response.

11. The apparatus of claim 1, wherein the apparatus is capable of transmission and reception associated with only non-overlapping time periods.

12. An apparatus for wireless communications, comprising:
    a first interface configured to output a first data unit for transmission on a first link and output a second data unit for transmission on a second link;
    the first interface or a second interface configured to obtain a first control response for the first data unit and obtain a second control response for the second data unit; and
    a processing system configured to generate a third data unit to be transmitted on the first link after reception of the first control response and generate a fourth data unit to be transmitted on the second link after the reception of the second control response, wherein:
       the processing system is further configured to defer the transmission of the fourth data unit to be later than a beginning of a detected transmission opportunity (TXOP) on the second link such that a beginning of the transmission of the fourth data unit coincides with a beginning of the transmission of the third data unit, wherein deferring the transmission of the fourth data unit comprises deferring the transmission of the fourth data unit at least until an end of the reception of the first control response; and
       the first interface or the second interface is further configured to output the third data unit for transmission on the first link and output the fourth data unit for transmission on the second link.

13. The apparatus of claim 12, wherein the second control response has a longer duration than the first control response.

14. The apparatus of claim 12, wherein each of the first control response and the second control response comprises a block acknowledgement (BA).

15. A method for wireless communications, comprising:
obtaining a first data unit on a first non-simultaneous transmit and receive (non-STR) link and a second data unit on a second non-STR link;
generating a first control response for the first data unit with one or more parameters to be transmitted on the first non-STR link, the one or more parameters of the first control response based on a duration field in at least one of the first data unit or the second data unit;
generating a second control response for the second data unit to be transmitted on the second non-STR link, the one or more parameters of the second control response based on the duration field in the at least one of the first data unit or the second data unit;
configuring the one or more parameters of the second control response in accordance with the one or more parameters of the first control response to align the first control response and the second control response by matching a length of the first control response and a length of the second control response; and
outputting the first control response for transmission on the first non-STR link and the second control response for transmission on the second non-STR link.

16. The method of claim 15, wherein the second data unit comprises an indication for triggering the transmission of the second control response, and wherein the second control response comprises a trigger-based data unit being output for transmission in response to the indication.

17. The method of claim 15, further comprising obtaining a management frame having an indication of the one or more parameters of the first control response and the one or more parameters of the second control response.

18. The method of claim 15, further comprising determining the one or more parameters of the first control response and the one or more parameters of the second control response based on the duration field in the at least one of the first data unit or the second data unit.

19. The method of claim 18, wherein the duration field is part of a control information field of the at least one of the first data unit or the second data unit.

20. The method of claim 15, wherein the duration field indicates a duration from an end of the first data unit or the second data unit to an end of the first control response or the second control response, respectively.

21. The method of claim 15, wherein the one or more parameters of the first control response comprise the length of the first control response, and wherein the one or more parameters of the second control response comprise the length of the second control response.

22. The method of claim 15, wherein generating the second control response comprises adding padding to the second control response to configure the one or more parameters of the second control response in accordance with the one or more parameters of the first control response.

23. A method for wireless communications, comprising:
outputting a first data unit for transmission on a first link and a second data unit for transmission on a second link;
obtaining a first control response for the first data unit and a second control response for the second data unit;
generating a third data unit to be transmitted on the first link after reception of the first control response;
generating a fourth data unit to be transmitted on the second link after the reception of the second control response;
deferring the transmission of the fourth data unit to be later than a beginning of a detected transmission opportunity (TXOP) on the second link such that a beginning of the transmission of the fourth data unit coincides with a beginning of the transmission of the third data unit, wherein deferring the transmission of the fourth data unit comprises deferring the transmission of the fourth data unit at least until an end of the reception of the first control response; and
outputting the third data unit for transmission on the first link and output the fourth data unit for transmission on the second link.

24. The method of claim 23, wherein the second control response has a longer duration than the first control response.

* * * * *